(12) United States Patent
Sakayama et al.

(10) Patent No.: US 7,755,792 B2
(45) Date of Patent: Jul. 13, 2010

(54) IMAGE PROCESSING APPARATUS, IMAGE APPARATUS SYSTEM, AND IMAGE PROCESSING METHOD

(75) Inventors: Takashi Sakayama, Kanagawa (JP); Hitoshi Tsushima, Kanagawa (JP); Takayuki Asako, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 983 days.

(21) Appl. No.: 11/403,945

(22) Filed: Apr. 14, 2006

(65) Prior Publication Data

US 2007/0127051 A1   Jun. 7, 2007

(30) Foreign Application Priority Data

Dec. 2, 2005   (JP)   ............... 2005-350029

(51) Int. Cl.
  *G06F 15/00* (2006.01)
  *G06F 15/16* (2006.01)
(52) U.S. Cl. ..................... 358/1.15; 709/229
(58) Field of Classification Search ............... 358/1.14, 358/1.15, 1.13, 1.18, 1.16, 1.1, 296; 399/80, 399/81, 82; 710/8, 36; 709/219, 224, 229, 709/226; 726/3, 16, 26; 719/321
See application file for complete search history.

(56) References Cited

U.S. PATENT DOCUMENTS

| 2003/0167336 | A1* | 9/2003 | Iwamoto et al. | ............. 709/229 |
| 2005/0183141 | A1* | 8/2005 | Sawada | ..................... 726/16 |
| 2008/0002226 | A1* | 1/2008 | Shigeeda | ................. 358/1.15 |

FOREIGN PATENT DOCUMENTS

| JP | A 2004-98505 | 4/2004 |
| JP | A 2005-38435 | 2/2005 |

* cited by examiner

*Primary Examiner*—Saeid Ebrahimi Dehkordy
(74) *Attorney, Agent, or Firm*—Oliff & Berridge, PLC

(57) ABSTRACT

An image processing apparatus that controls usage of the image processing apparatus by a user based on restriction information which indicates a function that the user is allowed to use and use information which indicates a number of recording medium that the user use, the image processing apparatus includes a controller that controls the usage of the image processing apparatus by managing a plurality of jobs on a single user basis if a plurality of jobs are generated when the single user performs login and logout a plurality of times.

15 Claims, 8 Drawing Sheets

FIG. 3

|  | full color | limited color | b&w |
|---|---|---|---|
| copy | yes | yes | yes |
| print | no | no | no |
| scan | no | NA | yes |
| fax/ifax | NA | NA | yes |

FIG. 4

|  | full color | limited color | b&w |
|---|---|---|---|
| copy | 10000 | 10000 | 50000 |
| print | 0 | 0 | 0 |
| scan | 0 | NA | 100000 |
| fax/ifax[1] | NA | NA | NA |

FIG. 5

|  | full color | limited color | b&w |
|---|---|---|---|
| copy | 10000 | 1000 | 40000 |
| print | 0 | 0 | 0 |
| scan | 0 | NA | 10000 |
| fax/ifax | NA | NA | NA |

IMAGE PROCESSING APPARATUS, IMAGE APPARATUS SYSTEM, AND IMAGE PROCESSING METHOD

BACKGROUND

1. Technical Field

This invention relates to an image processing apparatus and image processing method.

2. Related Art

Image processing apparatuses having image forming capabilities output printed materials, such as copying machines or printers. Such image processing apparatuses also have capabilities of so-called usage restrictions. The usage restrictions are set by inputting the upper limit value in advance. If the upper limit value of usage is reached during its use, the apparatus automatically stops the use. This upper limit value can be set for each user in some image processing apparatuses. For example, according to the user information to be registered in advance, the upper limit value of usage is predetermined and set for each registration user. If the registered user who is allowed to use the apparatus reaches the upper limit value of usage, the capabilities of usage restrictions operate to stop the further use. Among the capabilities of the usage restrictions, in particular, user restriction capabilities allow to set the upper limit value of usage for each user.

SUMMARY

The present invention has been made in view of the above circumstances and provides an image processing apparatus and image processing method that can control usage restrictions on a user's multiple jobs, even if multiple jobs are activated while login and logoff are being repeated several times.

According to one aspect of the present invention, there is provided an image processing apparatus that controls usage of the image processing apparatus by a user based on restriction information which indicates a function that the user is allowed to use and use information which indicates a number of recording medium that the user use, the image processing apparatus including a controller that controls the usage of the image processing apparatus by managing a plurality of jobs on a single user basis if a plurality of jobs are generated when the single user performs login and logout a plurality of times.

According to another aspect of the present invention, there is provided an image processing system that controls usage of an image processing apparatus by a user based on restriction information which indicates a function that the user is allowed to use and use information which indicates a number of recording medium that the user use, the system including a controller that controls the usage of the image processing apparatus by managing a plurality of jobs on a single user basis if a plurality of jobs are generated when the single user performs login and logout a plurality of times.

According to a further aspect of the present invention, there is provided an image processing method used for a image processing apparatus that controls usage of the image processing apparatus by a user based on restriction information which indicates a function that the user is allowed to use and use information which indicates a number of recording medium that the user use, the image processing method including controlling the usage of the image processing apparatus by managing a plurality of jobs on a single user basis if a plurality of jobs are generated when the single user performs login and logout a plurality of times.

BRIEF DESCRIPTION OF THE DRAWINGS

Embodiments of the present invention will be described in detail based on the following figures, wherein:

FIG. 3 shows right restriction information among the usage restriction information for each user to be supplied from an authentication agent server;

FIG. 4 shows the upper limit values of the usage restriction for each user to be supplied from the authentication agent server;

FIG. 5 shows current number of faces for printing used by each user calculated on an accounting server;

DESCRIPTION OF THE EMBODIMENTS

A description will now be given, with reference to the accompanying drawings, of embodiments of the present invention.

Figure 1:
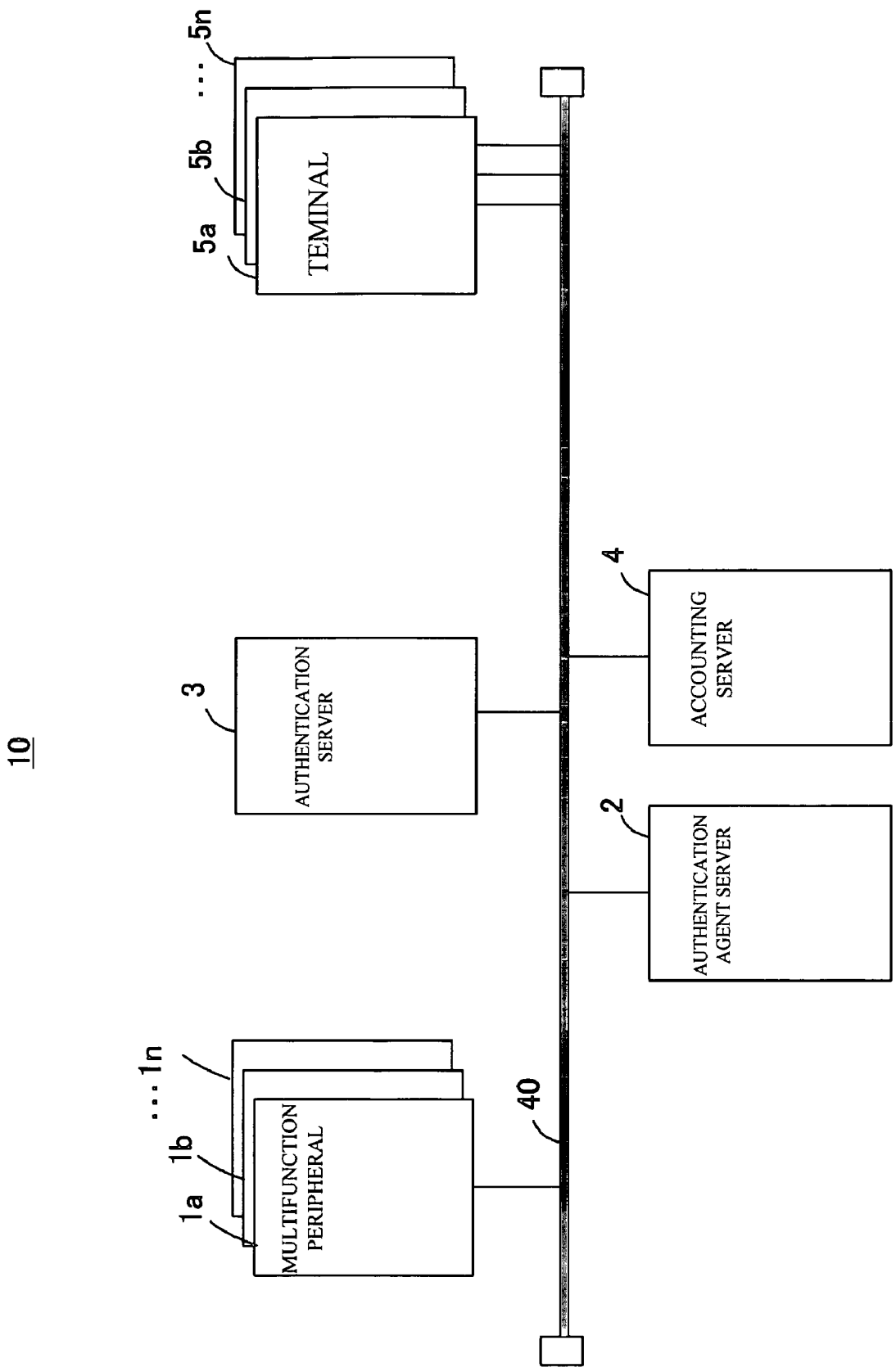
FIG. 1 shows an authentication agent system in accordance with an embodiment of the present invention.

FIG. 1 shows an authentication agent system in accordance with an embodiment of the present invention. An authentication agent system 10 is provided for authenticating users that use an image processing apparatus, and includes multifunction peripherals 1a through 1n that serve as an image processing apparatus, an authentication agent server 2 that respectively serves as a management server, an authentication server 3 that authenticates the user, a accounting server 4, and terminals 5a through 5n. These apparatuses, servers, and terminals are connected through a network 40.

The multifunction peripherals 1a through 1n have capabilities of making a photocopy, printing out, or sending and receiving facsimile. The multifunction peripherals 1a through 1n process the image data, controlling usage restrictions of the user on the basis of usage restriction information and use information. The usage restriction information is transmitted from the authentication agent server 2, and restricts the user's usage. The use information relates to a consumable number of faces (impressions) for printing that corresponds to the usage restriction information. The multifunction peripherals 1a through 1n includes machines that process colored image data and those that do not. The authentication agent server 2 implements the process of intermediating the authentication process between the authentication server 3 and the multifunction peripherals 1a through 1n, when receiving a request for authentication process relating to the user's usage from any one of the multifunction peripherals 1a through 1n. The authentication agent server 2 also manages the user restriction information for every user together with the personal information, and sends the corresponding usage restriction information to the multifunction peripherals 1a through 1n, as required.

The authentication server 3 operates a service that authenticates the user, and includes, for example, a directory service such as Microsoft's active directory or an authentication service such as Kerberos or Lightweight Directory Access Protocol (LDAP). Here, the directory service is a system that refers to the computer or printer on the network or refers to the information such as the user information, and is used for data or resource management in the distributed environment. With the active directory, it is possible to uniformly manage the user name, user configuration, and printers and servers on the network, thereby making it easy to construct a large-scale network system. The accounting server 4 calculates and manages the status of usage for each user on the multifunction peripherals 1a through 1n. The terminals 5a through 5n give a print instruction to the multifunction peripherals 1a through 1n.

Figure 2:
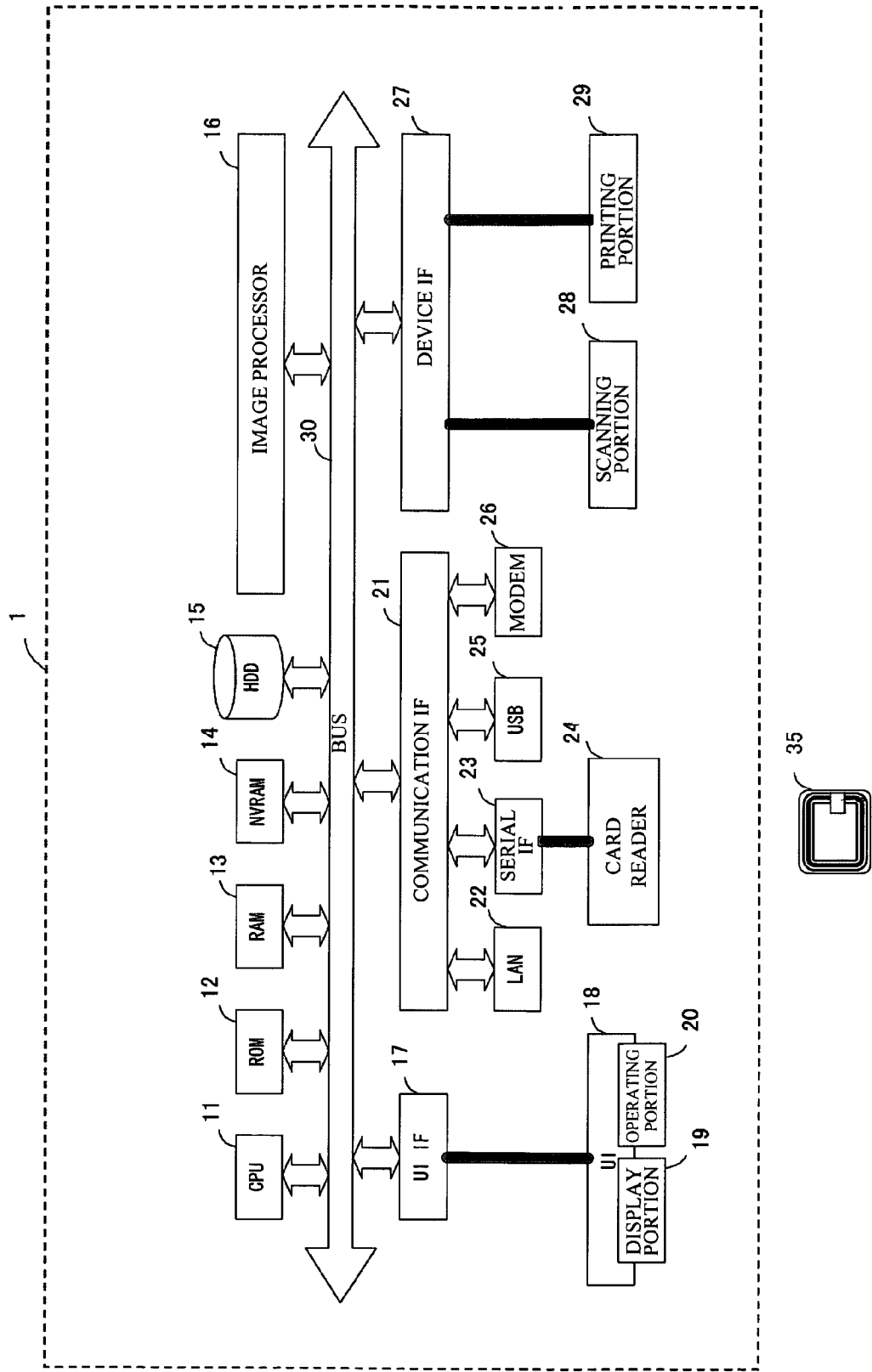
FIG. 2 shows a hardware organization of a multifunction peripheral, which serves an image processing apparatus in accordance with the present invention.

FIG. 2 shows a hardware organization of any one of the multifunction peripherals 1a through 1n, which serves an image processing apparatus in accordance with the present invention. Hereinafter, a multifunction peripheral 1 denotes any one of the multifunction peripherals 1a through 1n. The multifunction peripheral 1 includes a Central Processing Unit (CPU) 11, a Read Only Memory (ROM) 12, a Random Access Memory (RAM) 13, a Non-volatile RAM (NVRAM) 14, a Hard Disk Drive (HDD) 15, an image processor 16, an operating device interface (UI∘IF) 17, an operating device (UI) 18, a display portion 19, an operating portion 20, a communication interface (IF) 21, a Local Area Network (LAN) 22, a serial IF 23, a card reader 24, a Universal Serial Bus (USB) 25, a modem 26, a device IF 27, a scanning portion (input device) 28, and a printing portion (output device) 29, which are coupled via an internal bus 30.

The CPU 11 serves as a control portion and primarily performs control operations. For instance, the CPU 11 controls the usage restrictions of user's multiple jobs, by managing the job on a user basis. When a single user logs in and logs out of the multifunction peripheral 1 several times, multiple jobs are generated. The ROM 12 may store programs and fixed data, or may be composed of a rewritable flash memory. The RAM 13 is composed of a volatile memory, and serves as a system memory for program operation or a page memory for image processing. The NVRAM 14 is composed of a non-volatile memory, and stores non-volatile data, image quality adjustment, various configuration parameters, and various histories. The HDD 15 stores the image data and various histories. The image processor 16 expands and compresses the image data and processes various images. The UI∘IF 17 is an interface with the UI 18. The UI 18 controls the operating device, the panel, and the keys. The display portion 19 is equipped with a LCD, and includes an operating portion in the case of a touch panel. The operating portion 20 includes hard keys such as start, stop, and ten keys.

The communication IF 21 is an interface to various external devices and the network. The LAN 22 establishes a network connection, and utilizes 10/100 Base-T or various wireless LAN. The serial IF 23 establishes a connection with various external peripheral devices. In accordance with the present embodiment, RS232C connects the IC card reader 24. The card reader 24 reads the contents of non-contact IC card or contact magnetic card. The USB 25 connects a USB device. The modem 26 is composed of a modem controller that establishes a connection with a public circuit such as a facsimile, and enables various facsimile functionalities. The device IF 27 is an interface with various devices that compose the multifunction peripheral 1. The scanning portion 28 includes a portion that scans the image, a platen, and an automatic manuscript reader (by which both sides are readable). The printing portion 29 is equipped with a print engine.

A card 35 is made of a proximity type of non-contact IC card or contact magnetic card that stores user information (user ID) for authentication.

FIG. 3 shows right restriction information among the usage restriction information for each user to be supplied from the authentication agent server 2. In an example shown in FIG. 3, this user is allowed to do a color copy and monochrome (b & w) copy, but is not allowed to do a color print or monochrome print. This user is not allowed to do a color scan, but is allowed to fax and do an Internet fax. NA indicates that there is no upper limit. The CPU 11 controls the functions that can be provided to the user on the basis of such supplied right restriction information for each user.

FIG. 4 shows the upper limit values of the usage restriction for each user to be supplied from the authentication agent server 2. In an example shown in FIG. 4, this user is allowed to make a color copy up to 10,000 faces and monochrome (b & w) copy up to 50,000, and is also allowed to do a monochrome scan up to 100,000. FIG. 5 shows current number of the faces used by each user calculated on the accounting server 4. As shown in FIG. 5, this user has used 10,000 faces of full color copy, 1,000 faces of limited color copy, and 40,000 faces of monochrome (b & w) copy, and also has done 10,000 faces of monochrome (b & w) scan. The CPU 11 controls in such a manner that the user's current number of the used faces will not exceed the upper limit values on the basis of the upper limit values shown in FIG. 4 and the current numbers of used faces shown in FIG. 5.

Figure 6:
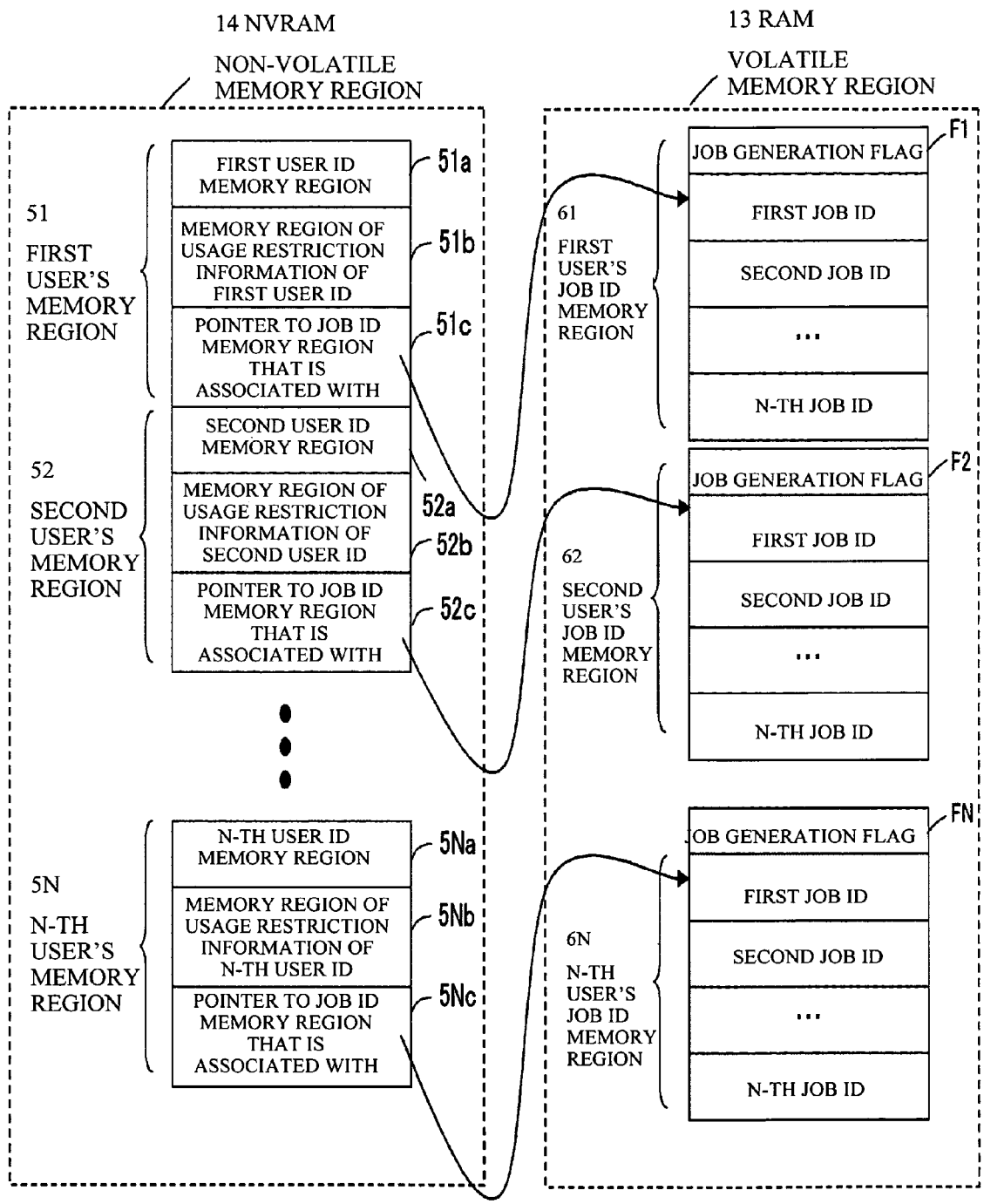
FIG. 6 shows the content of the non-volatile memory region and that of the volatile memory region.

FIG. 6 shows the content of the non-volatile memory region and that of the volatile memory region. The NVRAM 14 stores an account table. The account table includes a first user memory region 51, a second user memory region 52, through an N-th user memory region 5N. For example, the first user memory region 51 includes a first user ID memory region 51a, a memory region 51b of the usage restriction information that corresponds to the first user ID, and a pointer 51c to a job ID memory region that is associated with. A first user's job ID memory region 61 in the RAM 13 is associated with the pointer 51c of such associated job ID memory region.

Figure 10:
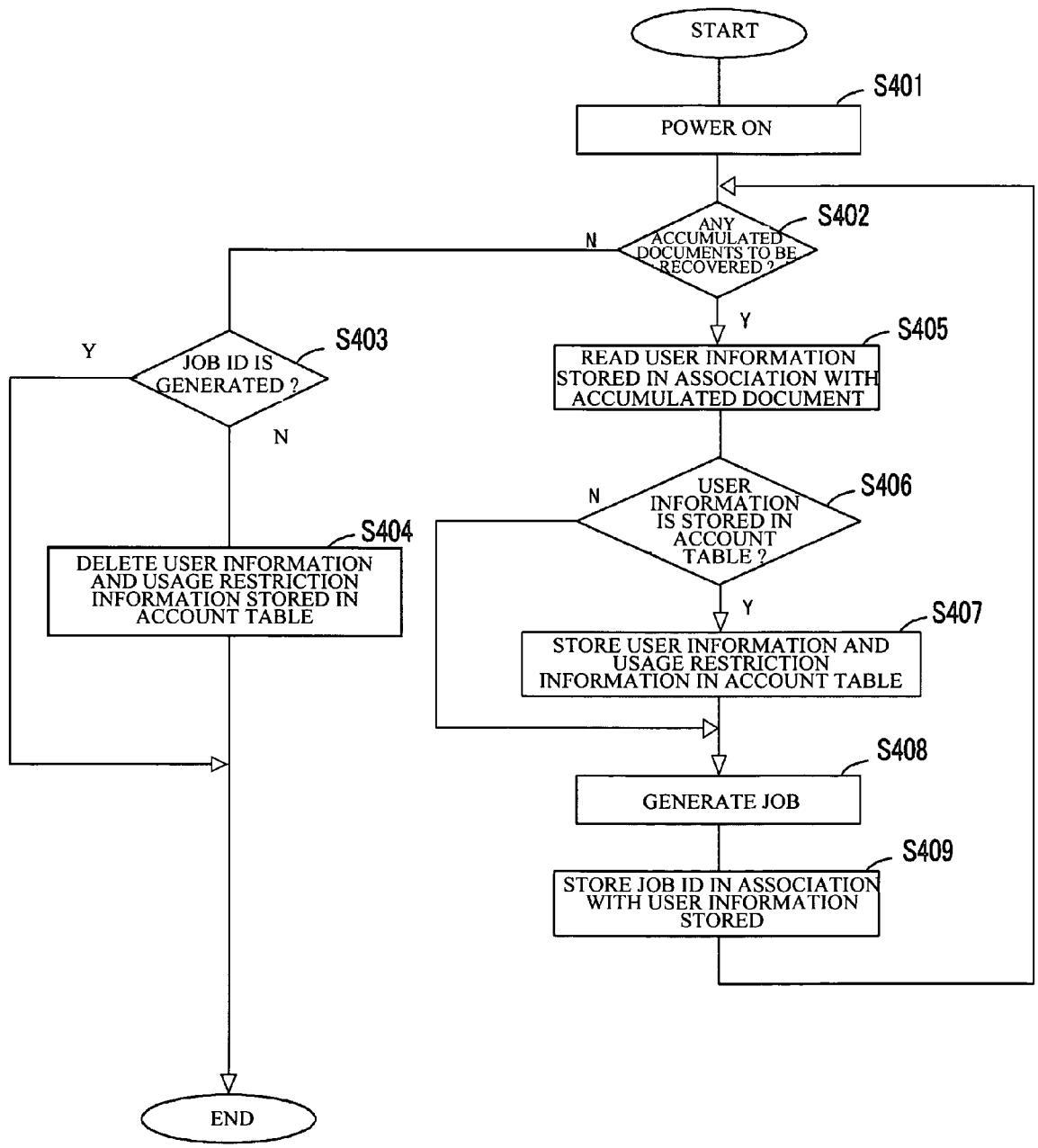
FIG. 10 is a flowchart of a recovery control process at the time of power on/off.

The first user's job ID memory region 61 is associated with a job generation flag memory region F1, a first job ID memory region, a second job ID memory region, through an N-th job ID memory region. Here, a job generation flag is used for determining whether or not the user who is stored in the account table should be deleted at step S116 in FIG. 8, as will be described later. The conditions for deleting the job stored in the account table is that the user logged out and all jobs activated by the user are completed. The job generation flag is set to "ON" at an initial job, and is set to "OFF" at a final job, as shown in FIG. 10, as will be described later. It is thus possible to determine whether all the jobs are completed.

The memory region 51b of the usage restriction information retains the consumable number to be used for the job that corresponds to the job ID in the first user's job ID memory region 61 in the RAM 13. For instance, 10 faces is scheduled to be used at the first job and 20 faces is scheduled to be used at the second job, the memory region 51b of the usage restriction information retains the respective numbers used for the jobs and the total numbers used for multiple jobs. Even if multiple jobs are generated by a single user, it is possible to learn the current number of used faces by adding the totally used numbers used for multiple jobs that have been calculated to the used number of the usage information.

Figure 7:
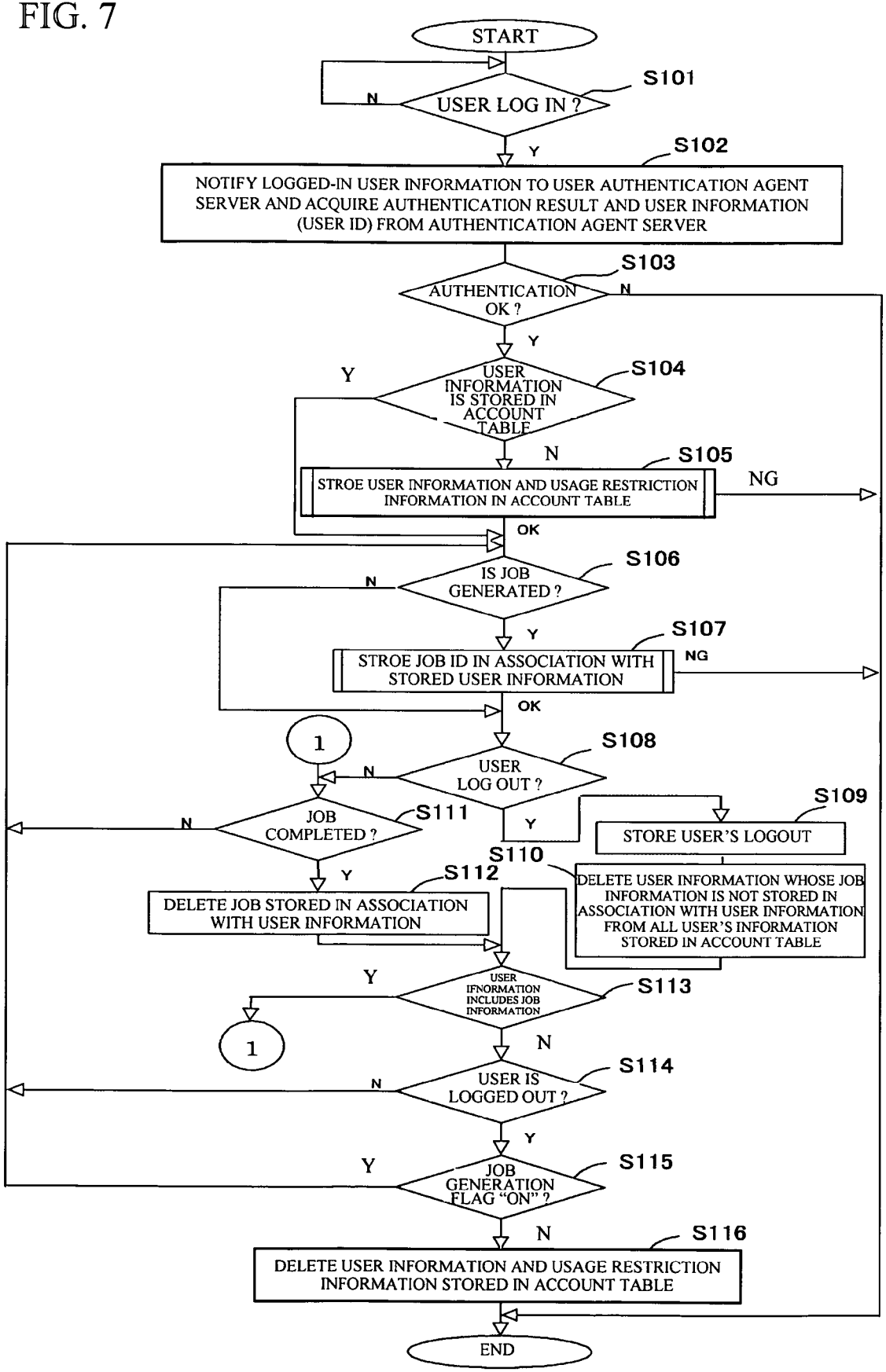
FIG. 7 is a flowchart of storage control of the user ID and the usage restriction information.

FIG. 7 is a flowchart of storage control of the user ID and the usage restriction information. When the user logs in at step S101, such logged-in user ID is notified to the authentication agent server 2 at step S102. The authentication agent server 2 requests the authentication server 3 for an authentication process. The authentication server 3 notifies the authentication result to the authentication agent server 2 subsequent to the authentication process. Then, the authentication agent server 2 notifies the authentication result to the multifunction peripheral 1 that issued the request.

The CPU 11 of the multifunction peripheral 1 acquires the authentication result, the user ID, and the usage restriction information from the authentication agent server 2. If the CPU 11 determines that the user is a valid one (at step S103) and the user ID is not stored in the account table (at step S104), such acquired usage restriction information is stored in the account table in the NVRAM 14 in association with the user ID (at step S105). For example, if the CPU 11 acquires the user ID and the usage restriction information of the first user from the authentication agent server 2 and the user ID of the first user is not stored in the account table, the user ID of the first user is stored in the memory region 51a and the usage restriction information of the first user is stored in the memory region 51b.

Next, a job is generated (at step S106). If the user ID is already stored in the NVRAM 14, the user ID is not registered here. The CPU 11 stores the activated job in association with the already stored user ID (at step S107). For example, if the user ID of the first user is already stored in the memory region 51a, the CPU 11 does not additionally register the user ID. The CPU 11 stores the job activated subsequent to login in the job ID memory region 61 of the first user in the RAM 13 in association with the user ID of the first user that is already stored.

The logged-in user logs off at step S108. The CPU 11 stores that the user is logged out (at step S109). If all the jobs activated subsequent to login are completed and there is no job ID stored in association with the user ID among all the user IDs registered in the account table, the corresponding user ID is deleted (at step S110). In a case where the external authentication is employed and the memory region has to be prepared for all users, the memory region for ten thousands users, for example, may have to be prepared. Therefore, the memory capacity can be reduced by deleting an unnecessary user ID from the NVRAM 14.

At step S108, if the user did not log out and the CPU determines that the job is completed (at step S111), the CPU 11 deletes the job ID stored in association with the user ID (at step S112). If there is no job ID stored in association with the user ID (at step S113), the user logged out (at step S114), and there is no job generation flag (at step S115), the CPU 11 deletes the user ID and the usage restriction information stored in the account table (at step S116). For example, if there is no job ID in the job ID memory region 61 of the first user and the user logged out and there is no job generation flag "ON", the CPU 11 deletes the user ID and the usage restriction information in the memory region of the first user that is stored in the account table. Multiple jobs were requested to generate when the user logged in, and such generated jobs are completed, although at least one of multiple jobs has not been generated yet. In this case, even if the user logged out and there is a remaining job that has not been generated, the CPU 11 does not delete the corresponding user information.

Figure 8:
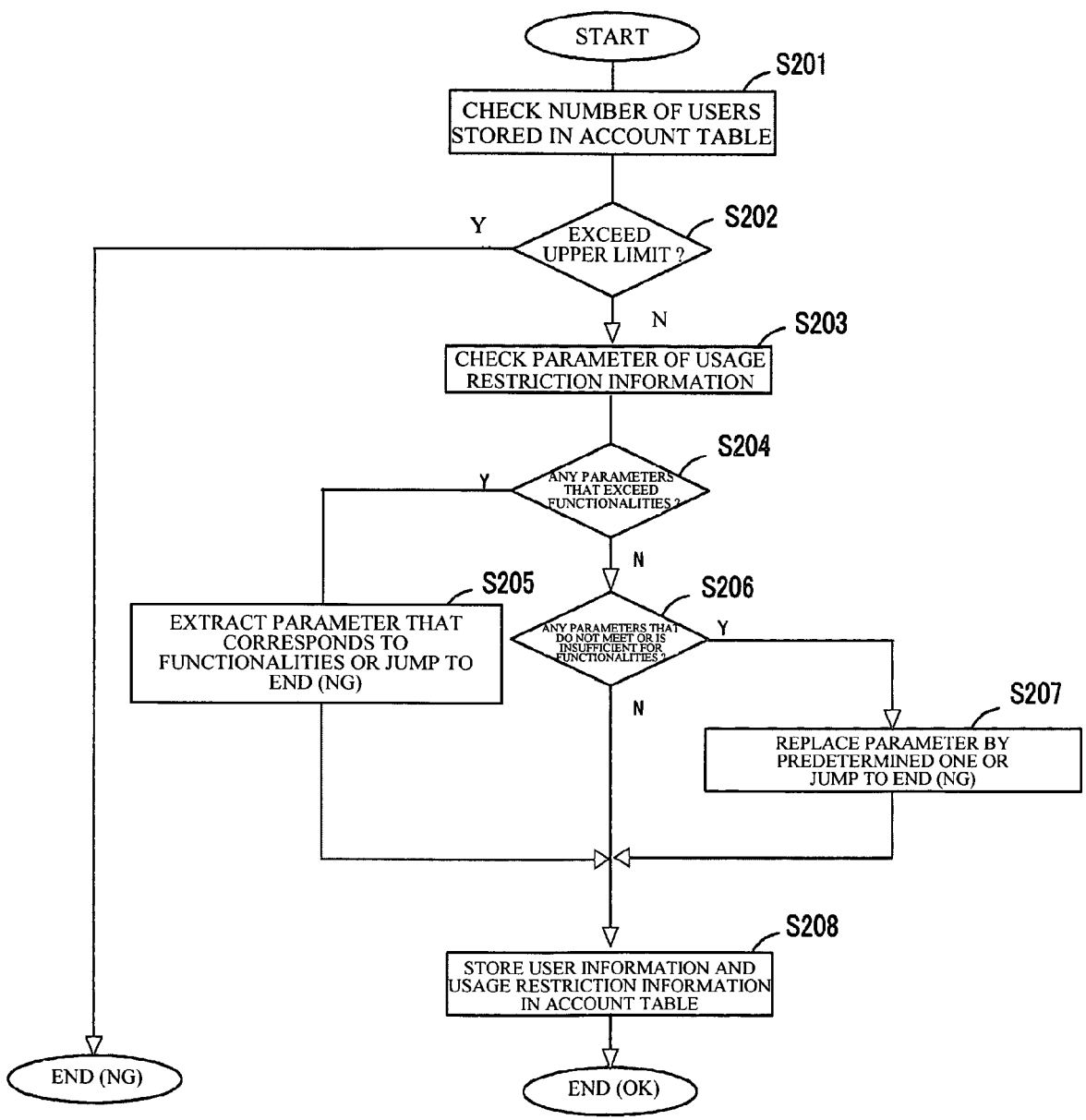
FIG. 8 is a flowchart of a registration process of the user ID into the account table.

FIG. 8 is a flowchart of a registration process of the user ID into the account table. The user ID memory regions 51a, 52a, through 5Na that store the IDs of the logged-in users have the predetermined upper limit values. For example, 50 is a predetermined upper limit number of the users that can be registered in the account table. The CPU 11 checks the number of the users stored in the account table (at step S201). If a new user logs in with a new user ID and the number of the logged-in users whose user information is stored exceeds the predetermined upper limit value, the CPU 11 implements an error process. If a new user logs in and the number of the logged-in users does not exceed the upper limit value (at step S202), a parameter of the usage restriction information is checked (at step 203). If the parameter of the usage restriction information includes the content that exceeds the functionalities that can be provided to the user, the CPU 11 controls the usage restrictions on the user's multiple jobs by use of the information that corresponds to the functionalities that can be provided to the user from among the usage restriction information.

If the parameter of the usage restriction information that includes the content that exceeds the functionalities of the multifunction peripheral 1 (yes at step S204), in other words, if the parameter of color is sent to the monochrome multifunction peripheral 1 from the authentication agent server 2, the parameter that meets the functionalities of the multifunction peripheral 1 is extracted or processing jumps to END (NG) as an error (at step S205). For example, if the upper limit value of the color faces or the information on the current number of the color faces is sent to the monochrome multifunction peripheral 1 from the authentication agent server 2, as a parameter of the usage restriction information, the CPU 11 controls the multifunction peripheral 1 with the use of the upper limit value of the monochrome faces and the information on the current number of used monochrome faces. If there is no information on the current number of used faces, 0 may be employed for operation.

If the content of the usage restriction information does not meet the content of the capabilities that can be provided to the user, the CPU 11 controls multiple usage restrictions of the user with the predetermined content of the usage restriction information. That is to say, if the parameter value of the necessary usage restriction information is insufficient (at step S206), the CPU 11 controls the multifunction peripheral 1 by replacing such insufficient parameter value of the usage restriction information by such predetermined parameter value of the usage restriction information, or jumps to the end NG (at step S207.) For example, unless the usage restriction information such as the upper limit value of the faces or the information on the current number of used faces is sent from the authentication agent server 2, the CPU 11 employs the maximum value for the upper limit value of the faces and sets 0 at the current number of used faces. Then, the CPU 11 stores the user ID and the usage restriction information in the account table (at step S208).

Figure 9:
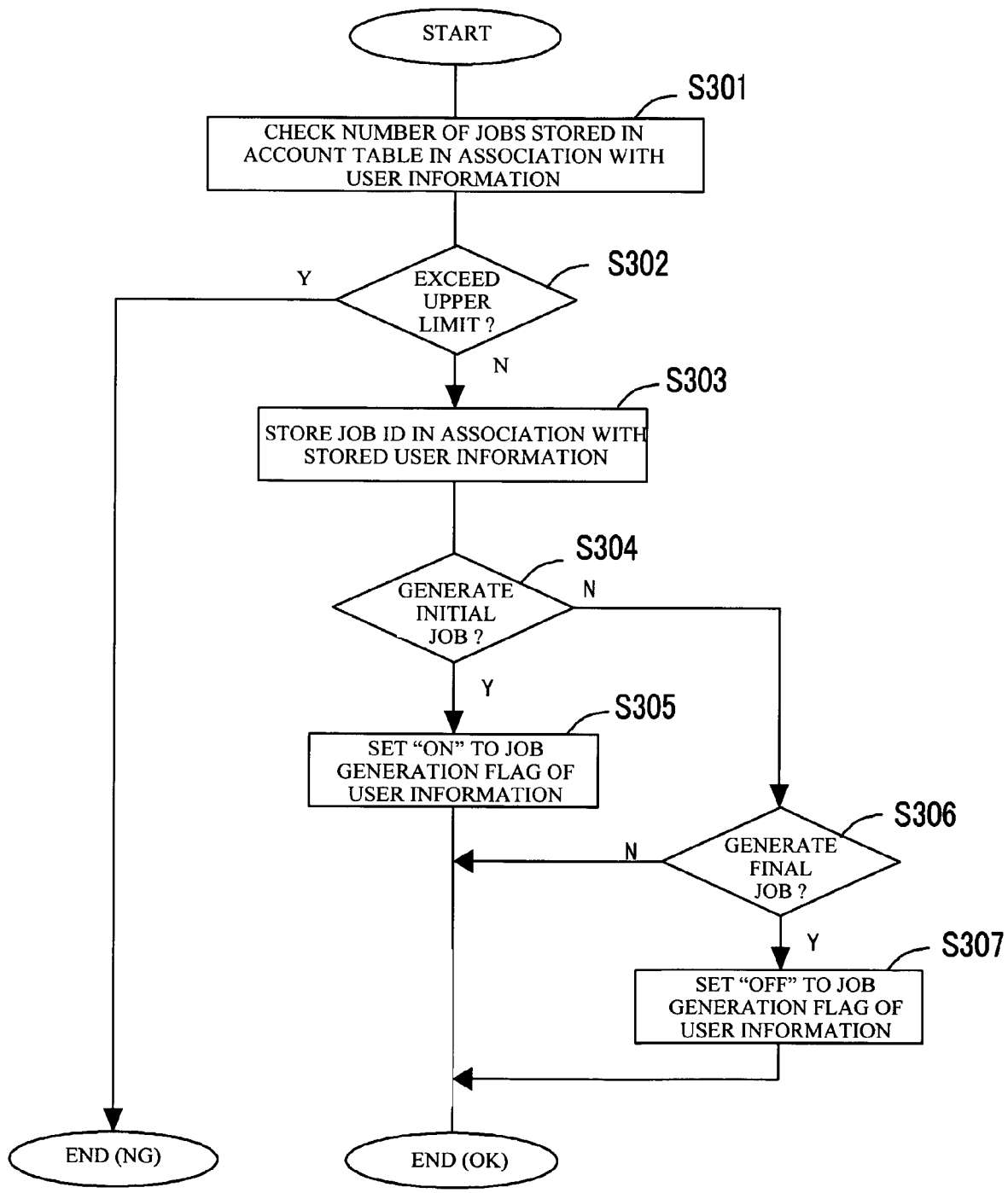
FIG. 9 is a flowchart of another registration process of the user ID into the account table.

FIG. 9 is a flowchart of another registration process of the user ID into the account table. The upper limit value of the job IDs to be stored in association with the logged-in user ID is predetermined. For example, 50 is a predetermined upper limit value of generated jobs of the user who is registered in the account table. The CPU 11 first checks the number of jobs stored in association with the user ID stored in the account table (at step S301). If a new job is activated and the number of generated jobs exceeds the upper limit value of the jobs that can be stored in association with the user information of the logged-in user, the CPU 11 does not permit the new job to be activated (Y at step S302).

If the number of generated jobs does not exceed an upper limit value (at step S302), the CPU 11 stores the job ID in association with the user ID (at step S303). If an initial job is generated (at step S304), set a job generation flag of the user ID to "ON" (at step S305). If the job is not the initial one (at step S304) and the job is a final one (at step S306), set the job generation flag of the user ID to "OFF" (at step S307).

FIG. 10 is a flowchart of a recovery control process at the time of power on/off. When the power is turned on (at step S401), the CPU 11 checks whether there is an accumulated document that should be recovered. If there is no accumulated document to be recovered (at step S402) and no job ID is generated by recovery to correspond to the user ID (at step S403), the CPU 11 deletes the user ID and usage restriction information stored in the account table (at step S404). Thus, it is possible to recovery after the power on/off certainly.

Meanwhile, if there is an accumulated document to be recovered (at step S402), the user ID stored in association with such accumulated document is read out of the NVRAM 14, and such recovered job is stored in the RAM 13 in association with the user ID (at step 405). If the user ID is not stored in the account table (at step S406), the CPU 11 stores the user ID and the usage restriction information in the account table (at step S407). Then, the CPU 11 generates a job (at step S408), and the job ID is stored in association with the stored user ID (at step S409).

In accordance with the present invention, the total used numbers of multiple jobs are calculated, when multiple jobs of a single user are generated. It is possible to learn the current number of used faces by adding the total used numbers used in multiple jobs to the used numbers according to the use information, thereby enabling to the control portion to control the usage restriction of multiple jobs of the user, even if multiple jobs are activated while multiple logins and logoff are being repeated.

An image processing method in accordance with the present invention is realized by an image processing apparatus. The image processing method in accordance with the present invention can be realized by a program to be executed by controlling a computer. This program is provided by storing in a magnetic disc, optical disc, semiconductor memory, and alternative storage device, or downloading the program through a communications line. Then, the steps of program are executed as the CPU operates the program.

Although a few embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2005-350029 filed on Dec. 2, 2005 including specification, claims, drawings, and abstract is incorporated herein by reference in its entirety.

What is claimed is:

1. An image processing apparatus that controls usage of the image processing apparatus by a user based on restriction information which indicates a function that the user is allowed to use and use information which indicates a number of recording medium that the user use, the image processing apparatus comprising:
a controller that controls the usage of the image processing apparatus by managing a plurality of jobs on a single user basis by detecting a plurality of times when a single user logs in and logs out of the image processing apparatus, and preventing processing of a particular job based upon the restriction information when the single user logs in and out of the image processing apparatus multiple times,
wherein the controller stores login activity and an account table containing user IDs and containing the corresponding jobs of the users within a memory portion.

2. The image processing apparatus as claimed in claim 1, wherein the controller stores the usage restriction information in association with user information of a logged-in user, and deletes the user information when the logged-in user logs off and all jobs activated by the logged-in user are completed.

3. The image processing apparatus as claimed in claim 1, wherein if user information of a user is already stored when the user log in, the controller stores a newly activated job in association with the user information.

4. The image processing apparatus as claimed in claim 3, wherein the controller deletes the user information, when all jobs associated with the user information are completed.

5. The image processing apparatus as claimed in claim 1, wherein if a number of logged-in users exceeds an upper limit value when a user login, the controller performs an error process.

6. The image processing apparatus as claimed in claim 1, wherein if an upper limit value of jobs that can be stored in association with user information is exceeded, the controller does not allow a new job to be activated.

7. The image processing apparatus as claimed in claim 1, further comprising:
a non-volatile memory that stores user information of a user who logs in; and
a volatile memory that stores information on the plurality of jobs in association with the user information,
wherein at a time of recovery after a power of the image processing apparatus is turned on or turned off, a job that has been recovered with use of the stored user information is newly stored in the volatile memory in association with the user information.

8. The image processing apparatus as claimed in claim 7, wherein if the job that is associated with the stored user information is not recovered, the controller deletes the user information.

9. The image processing apparatus as claimed in claim 1, wherein if the usage restriction information includes a content that corresponds a function that the image processing apparatus does not provide, the controller controls the usage of the image processing apparatus by means of a part of the content of the restriction information that corresponds to a function that the image processing apparatus provides.

10. The image processing apparatus as claimed in claim 1, wherein usage restriction information includes a content that is inefficient for the controlling, the controller controls the usage of the image processing apparatus based on a predetermined content of the usage restriction information.

11. The image processing apparatus as claimed in claim 1, further comprising a memory that stores information on a user who logs in and information on a job that is activated by the user, in association with each other, wherein if there is no information on a job associated with the user information when the user logs out, the control portion deletes the user information.

12. An image processing system that controls usage of an image processing apparatus by a user based on restriction information which indicates a function that the user is allowed to use and use information which indicates a number of recording medium that the user use, the system comprising:
a controller that controls the usage of the image processing apparatus by managing a plurality of jobs on a single user basis, by detecting a plurality of times when a single user logs in and logs out of the image processing apparatus, and preventing processing of a particular job based upon the restriction information when the single user logs in and out of the image processing apparatus multiple times, wherein the controller stores login activity and an account table containing user IDs and containing the corresponding jobs of the users within a memory portion.

13. The image processing system as claimed in claim 12, wherein the controller stores the usage restriction information in association with user information of a logged-in user, and deletes the user information when the logged-in user logs off and all jobs activated by the logged-in user are completed.

14. The image processing system as claimed in claim 13, wherein the controller does not delete the user information in a case where the logged-in user requests to generate a plurality of jobs, some of the plurality of jobs are generated and completed, and the logged-in user logs off before all the requested plurality of jobs are generated.

15. An image processing method used for a image processing apparatus that controls usage of the image processing apparatus by a user based on restriction information which indicates a function that the user is allowed to use and use information which indicates a number of recording medium that the user use, the image processing method comprising:

controlling the usage of the image processing apparatus by managing a plurality of jobs on a single user basis, by detecting a plurality of times when a single user logs in and logs out of the image processing apparatus, and preventing processing of a particular job based upon the restriction information when the single user logs in and out of the image processing apparatus multiple times; and storing login activity and an account table containing user IDs and containing the corresponding jobs of the users within a memory portion.

* * * * *